US012162726B2

(12) United States Patent
Brestensky et al.

(10) Patent No.: US 12,162,726 B2
(45) Date of Patent: Dec. 10, 2024

(54) METHOD AND DEVICE FOR MONITORING A PASSENGER TRANSPORT SYSTEM USING A DETECTION DEVICE AND A DIGITAL DOUBLE

(71) Applicant: INVENTIO AG, Hergiswil (CH)

(72) Inventors: Martin Brestensky, Pitten (AT); Robert Bartonik, Vienna (AT); Thomas Novacek, Schwechat (AT); Ulrich Häberle, Purkersdorf (AT)

(73) Assignee: Inventio AG, Hergiswil (CH)

( * ) Notice: Subject to any disclaimer, the term of this patent is extended or adjusted under 35 U.S.C. 154(b) by 981 days.

(21) Appl. No.: 17/260,708

(22) PCT Filed: Jul. 4, 2019

(86) PCT No.: PCT/EP2019/067930

§ 371 (c)(1),
(2) Date: Jan. 15, 2021

(87) PCT Pub. No.: WO2020/016017

PCT Pub. Date: Jan. 23, 2020

(65) Prior Publication Data

US 2021/0276832 A1 Sep. 9, 2021

(30) Foreign Application Priority Data

Jul. 19, 2018 (EP) .................................... 18184382

(51) Int. Cl.
*B66B 25/00* (2006.01)
*B66B 21/04* (2006.01)
*B66B 21/10* (2006.01)

(52) U.S. Cl.
CPC ............ *B66B 25/006* (2013.01); *B66B 21/04* (2013.01); *B66B 21/10* (2013.01)

(58) Field of Classification Search
None
See application file for complete search history.

(56) References Cited

U.S. PATENT DOCUMENTS 8,589,118 B2 11/2013 Idemori et al.
2007/0170037 A1* 7/2007 Kuroda ................ B66B 5/0012 198/322

(Continued)

FOREIGN PATENT DOCUMENTS

CN 106586796 A 4/2017
CN 108083044 A 5/2018

(Continued)

OTHER PUBLICATIONS

Fei Tao et al, "Digital twin-driven product design, manufacturing and service with big data", The International Journal of Advanced Manufacturing Technology, Band 94, No. 9-12, Mar. 16, 2017 (Mar. 16, 2017), pp. 3563-3576, XP055547858, DOI: 10.1007/s00170-017-0233-1 external link, ISSN:0268-3768, 1-13, pp. 3575-357; Figures 1-7.

(Continued)

*Primary Examiner* — Shelby A Turner
*Assistant Examiner* — Brandon J Becker
(74) *Attorney, Agent, or Firm* — Knobbe, Martens, Olson & Bear, LLP

(57) ABSTRACT

The disclosure relates to monitoring a state of a physical passenger transport system. A method comprises monitoring the state of the passenger transport system using an updated digital-double dataset (UDDD) that reproduces in a machine-processable manner characterizing properties of components of the physical passenger transport system in an actual configuration after its assembly and installation. At least one detection device is arranged in the conveyor belt of the physical passenger transport system that detects accelerations and changes in position in all three axes during (Continued)

operation, which are transmitted to the virtual conveyor belt of the UDDD. Using dynamic simulations, forces, impulses and vibrations resulting from the dynamic behavior of the conveyor belt, which act on the virtual components of the virtual conveyor belt, corresponding to the physical components, and on the virtual components which interact with the virtual conveyor belt, can be determined and evaluated.

14 Claims, 3 Drawing Sheets

(56) References Cited

U.S. PATENT DOCUMENTS

| | | | | |
|---|---|---|---|---|
| 2011/0106490 | A1* | 5/2011 | Idemori | B66B 29/005 702/154 |
| 2012/0043180 | A1* | 2/2012 | Braasch | B66B 29/005 198/322 |
| 2012/0051449 | A1* | 3/2012 | Bunter | B66B 5/0087 375/259 |
| 2012/0283870 | A1* | 11/2012 | Senger | B66B 25/006 700/230 |
| 2016/0132616 | A1* | 5/2016 | Hassel | H02J 3/00 703/1 |
| 2017/0190548 | A1* | 7/2017 | Nelson | B66B 25/006 |
| 2018/0029835 | A1* | 2/2018 | Li | B66B 21/02 |
| 2020/0065428 | A1* | 2/2020 | Farkas | G06F 30/20 |
| 2021/0216676 | A1* | 7/2021 | Novacek | B66B 19/00 |
| 2021/0256580 | A1* | 8/2021 | Norman | G06F 30/12 |

FOREIGN PATENT DOCUMENTS

| | | | |
|---|---|---|---|
| DE | 102010049954 | A1 | 7/2011 |
| DE | 102015217855 | A1 | 3/2017 |
| EP | 1634843 | B1 | 2/2011 |
| JP | 2009029524 | A | 2/2009 |
| WO | WO 2017103081 | A1 | 6/2017 |
| WO | WO 2018177708 | A1 | 10/2018 |

OTHER PUBLICATIONS

International Search Report for International Application No. PCT/EP2019/067930 dated Oct. 15, 2019.

* cited by examiner

METHOD AND DEVICE FOR MONITORING A PASSENGER TRANSPORT SYSTEM USING A DETECTION DEVICE AND A DIGITAL DOUBLE

TECHNICAL FIELD

The present application relates to a method and a device for monitoring properties of a passenger transport system configured as an escalator or a moving walkway. The application further relates to a passenger transport system equipped with a proposed device, a computer program product designed to carry out the proposed method, and a computer-readable medium storing said computer program product.

SUMMARY

Passenger transport systems in the form of escalators or moving walkways are used to convey passengers within buildings or structures. For this purpose, sufficient operational safety, but ideally also continuous availability, must always be ensured. Therefore, passenger transport systems are in most cases usually checked and/or serviced at regular intervals. The intervals are generally determined on the basis of experience with similar passenger transport systems, wherein the intervals must be selected to be sufficiently short in order to ensure operational safety, so that a check or maintenance is performed in time before any safety-endangering operating conditions arise.

In the case of older passenger transport systems, the checks are usually performed completely independently of the actual current state of the passenger transport system. This means that a technician must visit the passenger transport system and inspect it on-site. In such cases, it is often found that no maintenance is urgently required. The visit of the technician thus turns out to be superfluous and causes unnecessary costs. However, in the event that the technician actually detects the need for maintenance, an additional trip is in many cases required because the technician can only determine on-site which components of the passenger transport system require maintenance, and thus, it only becomes apparent on-site that, for example, spare parts or special tools are needed for maintenance or repair. A further problem is that after a few years—especially if the maintenance is carried out by third-party contractors—the system is no longer comprehensively documented in a technical manner and it is only possible to determine on-site which components are original and which components have been replaced by third-party products because in this field, there are a large number of suppliers exclusively for spare parts and for maintenance.

In the case of newer passenger transport systems, it is sometimes already possible to obtain indications in advance and/or from an external control center, for example, using sensors and/or by monitoring the active components of the system, for example, by monitoring the operation of a conveyor belt of the passenger transport system, that a state of the passenger transport system has changed, thus making a check or maintenance of the passenger transport system appear necessary. As a result, maintenance intervals can possibly be extended or adjusted as needed. However, a plurality of sensors is usually required, resulting in considerable additional investment. Furthermore, the additional sensors can lead to an increased susceptibility to failure. However, even in this case, a technician can usually only detect whether there is actually a need for maintenance and whether spare parts or special tools may be needed by visiting the site. Even with these systems, comprehensive technical documentation can no longer be expected after a certain period, depending on the maintenance provider.

Among other things, there may be a need for a method or a device, by means of which properties of a passenger transport system can be monitored more efficiently, more simply, with less effort, without the need for an on-site inspection, and/or with greater predictability. There may also be a need for a suitably equipped passenger transport system, for a computer program product for carrying out the method on a programmable device, and for a computer-readable medium having such a computer program product stored therein.

Such a need can be met with the subject matter described herein. Advantageous embodiments are defined in the claims and throughout the following description.

According to a first aspect of the disclosure, a method for monitoring a state of a physical passenger transport system using an updated digital-double dataset is proposed. It comprises the characterizing properties of components of the physical passenger transport system in a machine-processable manner. The updated digital-double dataset is assembled from component model datasets which include data which were determined by measuring characterizing properties on the physical passenger transport system after its assembly and installation in a structure. In the following, the updated digital-double dataset is referred to in abbreviated form throughout as "UDDD" for better readability.

The physical passenger transport system further comprises a continuously arranged conveyor belt which has at least one escalator step or pallet with a detection device. The detection device can detect accelerations and changes in position in all three axes during operation and output them as measurement data, wherein said measurement data can be transmitted to the UDDD. With dynamic simulations, forces, impulses and vibrations resulting from the measurement data, which act on the virtual components of the virtual conveyor belt, corresponding to the physical components, and on the virtual components which interact with the virtual conveyor belt, can be determined and evaluated using the UDDD. This means that the forces, impulses and vibrations resulting from the dynamic behavior of the conveyor belt, which act on the virtual components of the virtual conveyor belt and the virtual components which interact with the virtual conveyor belt, can be determined and evaluated with dynamic simulations using the UDDD.

Accordingly, the UDDD allows for the measurement data supplied by the detection device to be comprehensively examined in their field of application and the correct measures at the time of the evaluation can be derived therefrom. In the case of missing escalator steps or pallets, feedback can be sent immediately to the controller of the passenger transport system that the conveyor belt must be locked. In addition, the UDDD can be used to determine at which position the escalator step or pallet has detached itself from the step band and whether further damage is to be expected at this position, so that appropriate maintenance and repair material can be provided. The cause of the damage can also be determined more precisely and more quickly using simulations on the UDDD.

In the event of unusual accelerations or changes in the (inclined) position of the escalator steps or pallets equipped with the detection device, it can be determined, for example, using an advance simulation, whether a one-sided wear-related chain elongation on the conveyor belt of the corresponding passenger transport system could, because of its specific configuration, already lead to an excessive load of the step rollers and chain rollers due to a diagonal pull. Unusual accelerations can also be evaluated, so that, for example, problems resulting from the diagonal pull in the region of track joints and tangential rails can be examined using simulations. Not only the replacement of the conveyor chain of the conveyor belt, but also adjustment work on the guide rails and tangential rails, which represent the guide path of the conveyor belt, could be required measures. However, another passenger transport system of the same type, e.g., which has a conveyor chain with the same chain length, can continue to be operated without immediate measures because of the arrangement of its guide rails and tangential rails. Therefore, the advantage is maintenance individually tailored to each passenger transport system.

In other words, this means that the UDDD provides a virtual simulation environment that is almost identical to the physical passenger transport system due to the characterizing properties which image reality, and by means of which the effects of the accelerations and changes in position of the respective physical escalator step or pallet detected by the detection device can be evaluated. In the simulation, movements corresponding to the measurement data are transmitted to the corresponding virtual escalator step or pallet and, for example, using the known calculation methods from the fields of physics, mechanics and strength theory, the forces and impulses that occur when components collide, for example, a step roller with the guide flank of a guide rail, are calculated. Possible vibration phenomena can also be recognized from the impulses. The forces calculated from the simulation make it possible to examine the strength of the individual components, for example, using the finite element method, so that the time of a possible failure of individual components can be calculated in advance.

With regard to the occurrence of accelerations and changes in position that differ from the measurement data measured during startup, structural changes can be localized. For example, if the escalator step or pallet with the detection device always experiences a “hop” at the same point when the physical conveyor belt circulates, the thus detected peaks indicate that something is wrong with the guide rail. This can be, for example, a shift of two rail joints or a locally limited deposit of firmly pressed lubricant and dirt. However, if an escalator step or pallet detects a continuous “rattling” with the detection device while the physical conveyor belt is circulating, it may indicate that the step roller or chain roller of said escalator step or pallet is defective. In addition, impending collisions can also be detected if the play in the conveyor chains of the conveyor belt increases due to signs of wear and the escalator steps or pallets can thus collide with the comb plates in the entry regions of the passenger transport system due to an increase in their degree of freedom.

The results of these simulations and calculations are only as good as the UDDD images the assigned physical passenger transport system. It is therefore essential that the UDDD is assembled from component model datasets that comprise data that were determined by measuring characterizing properties on the physical passenger transport system after it was assembled and installed in a structure. The characterizing properties of a component model dataset can be the existing geometric conditions, the physical properties stored in the component model datasets, and the like. As a result, the UDDDs differ from one another even in identically constructed passenger transport systems because, instead of the target measurements, they contain, for example, the actual measurements of the physical components as characterizing properties. As a result, a tolerance chain of a plurality of composite component model datasets is replaced by the exact actual measurements, so that the positions of the virtual components in the UDDD correspond exactly to those of their physical counterparts in the assigned physical passenger transport system.

Since a precise virtual passenger transport system that is almost identical to the assigned physical passenger transport system is present with the UDDD, it can also be displayed as a three-dimensional, animated graphic on a suitable output device, for example, on a computer screen. In this case, for example, the unevenness and damage, on which the accelerations and changes in position is based, can be modeled precisely on the virtual component model datasets and contrasted in color with the original constitution of the components, so that the viewer, for example, a service technician, can see exactly where damage needs to be repaired or adjustment work must be carried out.

In other words, the dynamics of the physical step band measured by the detection device on the physical passenger transport system is transmitted to the virtual step band of the UDDD, so that forces and impulses on components can be determined and the unevenness and damage caused by the accelerations and changes in position can be modeled and calculated. In particular, fatigue strength calculations can be used to calculate the time of a possible failure of components According to a second aspect of the disclosure, a device for monitoring a state of a physical passenger transport system is proposed. It comprises a UDDD assembled from component model datasets, which reproduces in a machine-processable manner characterizing properties of components of the physical passenger transport system in an actual configuration of the physical passenger transport system after its assembly and installation in a structure.

Furthermore, at least one detection device with a 3-axis acceleration sensor and a gyroscope is provided. With said detection device, accelerations and changes in position of a physical escalator step or pallet of a conveyor belt can be detected as measurement data in all three axes along its guide path during the operation of a physical passenger transport system. These measurement data can be transmitted to the UDDD. Using static and dynamic simulations on the UDDD, the transmitted measurement data can be used to determine and evaluate the resulting forces, impulses and vibrations which act on the virtual components of the virtual conveyor belt, which correspond to the physical components, and the virtual components interacting with said virtual components.

According to a third aspect of the disclosure, a physical passenger transport system is proposed which comprises a device according to an embodiment of the second aspect.

According to a fourth aspect of the disclosure, a computer program product is proposed which comprises machine-readable program instructions which, when executed on a programmable device, prompt the device to carry out or control a method according to an embodiment of the first aspect.

According to a fifth aspect of the disclosure, a computer-readable medium is proposed, in which a computer program product according to an embodiment of the fourth aspect is stored.

Possible features and advantages of embodiments of the disclosure can be considered, among others, and without limiting the disclosure, to be based on the ideas and findings described below.

As initially stated, passenger transport systems thus far must usually be inspected on-site in order to be able to detect whether maintenance or repair is currently necessary and, if so, what specific measures have to be taken, for example, which spare parts and/or tools are required.

In order to avoid this problem, the use of a UDDD for monitoring is proposed. For this purpose, the UDDD is supposed to comprise data which characterize the characterizing properties of the components forming the passenger transport system and represents, in its entirety, as complete an image as possible of the physical passenger transport system assigned to the UDDD. The data of the UDDD are supposed to characterize the properties of the components in their actual configuration, e.g., in a configuration, in which the components have been fully completed and subsequently assembled to form the passenger transport system installed in a structure. Accelerations and changes in position of components of the conveyor belt are also transmitted to the UDDD, so that the UDDD also has the dynamic information relating to the running behavior of the physical conveyor belt and its changes over time.

In other words, the data contained in the UDDD do not merely reproduce target properties of the components, such as are assumed, for example, during planning, designing, and commissioning of the passenger transport system, and as they can be taken, for example, from CAD data relating to the components and used for this purpose. Instead, the data contained in the UDDD are supposed to reproduce the actual properties of the components installed in the fully assembled and installed passenger transport system. The UDDD can thus be considered to be a virtual image of the completed passenger transport system or the components contained therein.

For this purpose, the data contained in the UDDD are supposed to reproduce the characterizing properties of the components in sufficient detail in order to be able to derive information therefrom about the current structural and/or functional properties of the passenger transport system. In particular, using the UDDD, it can be possible to derive information about current structural and/or functional properties which characterize an updated state of the entire passenger transport system, which can be used to evaluate the current or future operational safety of the passenger transport system, its current or future availability and/or a current or future need for maintenance or repair.

A particular advantage results from the use of the UDDD during the entire service life of the physical passenger transport system. For example, if the UDDD is supposed to be used again, a comprehensive documentation or tracking of the data of the UDDD is enforced because the operational monitoring, maintenance predictions, and the determinations of state are otherwise based on incorrect data. This means that in the case of a replacement of components, the characterizing properties of the spare parts must be detected digitally. In case of maintenance work, the characterizing properties of the components removed are replaced in the UDDD by the characterizing properties of the spare parts. Any adjustment measurements must also be detected and transmitted to the UDDD. In order to facilitate the work of the fitters, the component measuring work and adjustment measurements can be detected on-site using optical detection devices, for example, a laser scanner or a TOF camera (time of flight camera). Their data are then automatically evaluated by a processing program, processed for and transmitted to the UDDD.

The UDDD thus differs, for example, from digital data which are conventionally generated or used in the production of passenger transport systems. For example, when planning, designing, or commissioning a passenger transport system, it is common to use computers and CAD programs to plan or design the components used, so that corresponding CAD data reproduce, for example, a target geometry of a component. However, such CAD data do not indicate what geometry a produced component actually has, wherein, for example, production tolerances or the like can result in the actual geometry differing significantly from the target geometry. Precisely such differences have a fundamental effect on simulation results and thus on their informative value.

In particular, conventionally used data, such as CAD data, do not indicate which characterizing properties components have assumed after they have been assembled to form the passenger transport system and installed in a structure. Depending on how assembly and installation were carried out, significant changes in the characterizing properties of the components can occur when compared to their originally designed target properties and/or when compared to their properties immediately following production but prior to assembly and installation.

The UDDD also differs from data as they are conventionally used in part during a production of complex workpieces and machines. For example, DE 10 2015 217 855 A1 describes a method for checking consistency between reference data of a production object and data of a so-called digital twin of the production object. In this case, a digital image of a workpiece, referred to as a digital twin, is synchronized with the state of the workpiece during production. For the production process, this means that, after each production step, the data reproducing the digital twin are modified such that the changes in the properties of the workpiece to be effected by the production step are to be taken into account.

For example, it can be provided in a production step to remove a region of the workpiece by grinding, lathing, or the like in accordance with target specifications so that, after the production step has been carried out, the digital twin is also modified in accordance with the target specifications. In this way, the digital twin is supposed to always provide information about the current intermediate state of the workpiece during its production.

However, particularly in the production of components for passenger transport systems, DE 10 2015 217 855 A1 does not provide for taking into account data in the digital twin, which reproduce the actual characterizing properties of the components, particularly actual characterizing properties of the components after their assembly to form a completed passenger transport system and its installation in the structure. Instead, the data in the digital twin are usually based exclusively on target properties as can be reproduced, for example, in the form of CAD data.

In order to be able to monitor or possibly even forecast the state of a passenger transport system with sufficient accuracy and/or reliability, it is now proposed to provide the data usable for this purpose in the form of the UDDD. For this purpose, the UDDD provides information, which extends beyond mere target properties synchronized with the physical passenger transport system, about the characterizing properties of the components installed in the passenger transport system in their actual configuration. Such information can advantageously be used, for example, to be able to detect deviations in the actual characterizing properties from originally designed characterizing properties of the passenger transport system. From such deviations, it is possible to draw suitable inferences, for example, whether they cause excessive forces, impulses, and vibrations already resulting in a need for maintenance or repair of the passenger transport system, whether there is a risk of increased or premature wear, etc. For example, the deviations can arise from production tolerances that occur during the production of the components, from changes in the characterizing properties of the components effected by the assembly of the components or during their installation in the structure, and/or from changes in the characterizing properties of the components that occur during the eventual operation of the passenger transport system.

Due to the fact that the UDDD, as a virtual digital copy of the actual passenger transport system, allows for inferences about the characterizing properties currently prevailing in the passenger transport system, information which allows for inferences about the current state of the passenger transport system and particularly inferences about possibly required maintenance or repair can ideally be obtained solely by analyzing and/or processing the UDDD. If required, it is even possible to derive information about which spare parts and/or tools are needed for upcoming maintenance or repair.

For this purpose, the UDDD can be stored, analyzed, and/or processed in a computer or in a corresponding data processing system configured for carrying out the method proposed herein. In particular, the computer or the data processing system can be arranged remotely from the passenger transport system to be monitored, for example, in a remote monitoring center.

Accordingly, the use of the UDDD makes it possible to monitor, continuously or at suitable time intervals, and remotely from the physical passenger transport system, properties characterizing the state of the passenger transport system in order to detect particularly simulation results that make maintenance or repair seem necessary. If necessary, specific information based thereon regarding work to be carried out during maintenance or repair can be derived in advance, based solely on an analysis of the UDDD, without a technician actually having to inspect the passenger transport system on-site. This can considerably reduce expenditure and costs.

According to one embodiment, the measurement data transmitted by the detection device and/or the characterizing properties determined therefrom can be stored with time information in a log file. This has the advantage that a data history is available, from which, for example, special events can be read out, such as an instantaneous excessive force effect due to improper use or due to external influences such as seismic impacts and the like.

Furthermore, using the measurement data and/or characterizing properties stored in the log file as well as operating data stored in the log file, a change trend in the measurement data can be determined using stochastic methods. Operating data are data that arise during the operation of a passenger transport system, for example, total operating time, drive motor power consumption, ambient temperature, operating temperature, and the like. The findings gained therefrom can be used in many ways. If the change trend of the measurement data is linear, the end of the service life can be predicted quite accurately for the affected component due to an increasing impulse strength or an increasing force effect. A change trend having a declining tendency indicates a running-in behavior and thus an increasingly stable state of the affected component. In case of an upward tendency of the change trend, increased signs of wear, disintegration or destruction can be diagnosed. Additional advantages are described below.

The transmission of the measurement data can take place continuously, periodically and/or depending on the trend change in the measurement data. In the case of a dependency on the change trend, this means that a fixed cycle duration can be selected if the change trend has a linear tendency. In case of a declining tendency, the cycle duration can be increasingly extended, whereas in case of an upward tendency, the cycle duration between two measurements can be increasingly shortened.

According to a further embodiment, monitoring the state of the physical passenger transport system also comprises a simulation of future characterizing properties of the passenger transport system using the UDDD and based on the change trends of the measurement data detected by the detection device.

The characterizing properties of the physical components can be the geometric dimensions of the component, the weight of the component and/or the surface properties of the component. Geometric dimensions of the components can be, for example, a length, a width, a height, a cross-section, radii, fillets, etc. of the components. The surface property of the components can comprise, for example, roughnesses, textures, coatings, colors, reflectivities, etc. of the components.

The characterizing properties can relate to individual components or component groups. For example, the characterizing properties can relate to individual components, from which larger, more complex component groups are assembled. Alternatively or additionally, the properties can also relate to more complex devices assembled from a plurality of components, such as drive motors, gear units, conveyor chains, etc.

The characterizing properties prior to startup can be determined or measured with high precision. In particular, the characterizing properties can be determined or measured with a precision that is more precise than the tolerances to be observed during the production of the components.

Based on the change trends in the measurement data, changes can also be modeled on the component model datasets, which cause corresponding changes in position and accelerations. If, for example, the detection device registers a sudden, permanent tilting of the escalator step or pallet in two axes, it can be transmitted to the corresponding component model dataset of the UDDD. By simulating the tilting of the virtual escalator step or pallet, it can be seen that the virtual step roller or chain roller of the virtual escalator step or pallet penetrates the virtual guide rail. If the penetration depth corresponds to the radius of the step roller or chain roller, it means that the physical step roller or chain roller is defective or has broken off completely. The UDDD can now be updated such that the corresponding component model dataset of the step roller or chain roller is removed and the tilting is tracked by changing the corresponding characterizing features of the escalator step or pallet. Using a dynamic simulation with the tilted escalator step or pallet, a collision with fixed component model datasets, for example, with the virtual comb plate, can be simulated and detected by a collision check. In this example, the dynamic simulation with the UDDD will result in a spatial overlap of the virtual escalator step or pallet with the virtual comb plate. The system can automatically carry out a corresponding evaluation using suitable image analysis methods (comparison with the original state) and output the results via a suitable interface, for example, as a graphic representation on a screen. If a risk of collision is detected by the dynamic simulation, a safety signal is immediately sent to the physical controller of the physical passenger transport system, which immediately locks the conveyor belt.

A continuous increase of the change trend of a tilting to one side indicates, for example, an at least partially blocked or sluggish step roller or chain roller, which is pulled over the guide rail by the continuous movement of the conveyor belt and continuously abraded on the circumference. The simulation shows that the step roller or chain roller appears to penetrate continuously into the guide rail. By extrapolating the change trend with the aid of dynamic simulations (the virtual conveyor belt is kept running with the detected, increasing tilting), it can be determined when and where the tilting of the virtual escalator step or pallet leads to possible collisions with fixed, virtual components.

If the detection device only detects a local tilting, e.g., only at a certain point of the circulation path of the escalator step or pallet, a deformation or local lowering of one of the physical guide rails may be indicated. The component model dataset of the corresponding guide rail can now be adapted in that the corresponding, characterizing features that describe the three-dimensional shape are changed accordingly. As a result, the UDDD is updated. A subsequent dynamic simulation can be used to determine the effects on the step rollers or chain rollers (e.g., transverse forces) and the resulting additional wear or even possible progressive destruction of the step roller or chain roller, for example, through an analysis using the finite element method. These results can then be extrapolated temporally, so that the time of a possible failure and/or a collision caused by wear can be determined.

In other words, the properties currently prevailing in the passenger transport system should not only be monitored using the UDDD, but it should also be possible to draw inferences about future characterizing properties prevailing in the passenger transport system using simulations to be carried out using the UDDD.

For this purpose, the simulations can be carried out on a computer system. Proceeding from data currently contained in the updated digital-double dataset and possibly taking into account data previously contained in the updated digital-double dataset, it is possible using the simulations to draw inferences about a temporal development in the detected measured values and thus obtain forecasts or extrapolation with regard to expected future measured values. In the simulations, it is possible to take into account both physical conditions and experiences with other passenger transport systems.

This means that, alternatively or additionally, experiences gained from experiments and/or observation of other passenger transport systems can be taken into account in the simulations, and from which, for example, information can be derived as to when a change in accelerations and positions, which has occurred or is expected in the future, must be assumed to be essential for the function of the entire passenger transport system, so that suitable measures should be initiated, for example, as part of maintenance or repair.

The accelerations and changes in position detected by the detection device can also be examined for periodically occurring peaks. The occurring peaks can be assigned to a point on the guide path of the conveyor belt. Such peaks are usually caused by collisions. This means that there must be a problem at said point in the guide path, which needs to be rectified quickly, so that no physical components are destroyed or no safety-critical situations can arise.

In particular, the method proposed herein can further comprise a planning of maintenance work to be carried out on the passenger transport system based on the monitored accelerations and changes in position of the passenger transport system.

In other words, the information obtained during a monitoring according to the disclosure of the accelerations and changes in position of the passenger transport system can be used to suitably plan in advance future maintenance work, including any necessary repairs. In this case, it can be advantageous that, solely by analyzing the updated digital-double dataset, valuable information can be obtained, for example, regarding changes that have occurred in a monitored passenger transport system and/or what kind of wear on components of the passenger transport system must actually be expected. This information can be used to be able to plan for maintenance work, for example, with regard to a time of maintenance and/or with regard to activities to be carried out during maintenance and/or with regard to spare parts or tools to be kept available during maintenance, and/or with regard to technicians performing the maintenance who may need to have special skills or knowledge. In most cases, planning for the maintenance work can take place based purely on an analysis of the updated digital-double dataset, e.g., without a technician having to inspect the passenger transport system on-site.

It is also possible to develop and test new, improved physical components and particularly control components (hardware and software) using the updated digital-double dataset. According to the hardware-in-the-loop approach, the component model dataset of a component to be tested can in this case be deactivated in the updated digital-double dataset and the updated digital-double dataset can be connected via suitable interfaces to the component to be tested. In this case, the suitable interface can be a test station adapted to the mechanical and/or electrical interfaces of the physical component and connected to a computer system having the UDDD. In other words, in accordance with the hardware-in-the-loop approach, an embedded system (e.g., a real electronic control unit or a real mechatronic component, the physical component or the physical component group) is thus connected via its inputs and outputs to the UDDD, wherein the UDDD serves as a replica of the real environment of the system or of the entire escalator or the entire moving walkway. As a result, the UDDD, from the test perspective, can be used to safeguard embedded systems, provide support during development, and contribute to an early startup of machines and systems.

A further advantage of the UDDD is its inherent systems engineering approach. The focus of systems engineering is that of meeting the customer's requirements, which are contained in the specification, for the system to be delivered within the cost and time frame, in that the system is broken down into and specified as subsystems, devices, and software, and the implementation is checked continuously across all levels until delivery to the customer. For this purpose, the entire problem (operation, costs, schedule, performance, training and support, testing, production and reuse) should be taken into account. Systems engineering integrates all of these engineering disciplines and skills into a uniform, team-oriented, structured process which, depending on the complexity of the system, can extend over several levels including a device of a subcontractor. This process is used from conception to production to operation and in some cases through to disassembly or reuse. By imaging all physical components as component model datasets with all their characterizing properties and interface information—combined and constantly updated in the UDDD—said UDDD offers an excellent systems engineering platform for implementing the customer's requirements for the escalator or moving walkway to be delivered beyond the installation of the physical product in the shortest possible time.

According to one embodiment of the present disclosure, the proposed monitoring method also comprises the creation of the UDDD. Creating the UDDD comprises at least the following steps, preferably but not necessarily strictly in the order provided:

(i) Creating a commissioning digital-double dataset with target data which reproduce characterizing properties of components of the passenger transport system in a target configuration;

(ii) creating a finalization digital-double dataset based on the commissioning digital-double dataset by measuring actual data which reproduce characterizing properties of components of the physical passenger transport system in the actual configuration of the passenger transport system immediately after its assembly and installation in a structure, and replacing target data in the commissioning digital-double dataset with corresponding actual data; and (iii) creating the UDDD based on the commissioning digital-double dataset by updating and matching the finalization digital-double dataset during the operation of the physical passenger transport system, taking into account changes in position and accelerations detected by the detection device.

In other words, the UDDD can be created in several substeps. For this purpose, the data contained in the dataset can be successively refined and specified, so that, with the ongoing creation of the UDDD, the characterizing properties of the components installed in the passenger transport system are reproduced more and more precisely with regard to their actual current configuration. A refinement is achieved particularly by transmitting the changes in position and accelerations, which allows for a remodeling of the virtual guide path of the conveyor belt, thus creating an extremely precise simulation environment.

However, the commissioning digital-double dataset described above is not simply available “off the shelf.” According to a further embodiment, creating the commissioning digital-double dataset comprises an advance creation of a digital-double dataset, taking into account customer-specific configuration data, and a creation of production data by modifying the digital-double dataset, taking into account production-specific data.

In other words, both customer-specific configuration data and production-specific data should be taken into account when initially creating the commissioning digital-double dataset. As a rule, a digital-double dataset is in this case first created from component model datasets, taking into account the customer-specific configuration data, and said digital-double dataset is subsequently modified or refined, taking into account the production-specific data. Creating the commissioning digital-double dataset can possibly also comprise iteratively multiple calculations and modifications of data from the digital-double dataset, taking into account customer- and/or production-specific data.

In this case, customer-specific configuration data can refer to specifications which are specified by the customer in individual cases, for example, when ordering the passenger transport system. The customer-specific configuration data typically relate to a single passenger transport system to be produced. For example, the customer-specific configuration data can comprise prevailing spatial conditions at the installation location, interface information for the attachment to supporting structures of a structure, etc. In other words, the customer-specific configuration data can specify, for example, how long the passenger transport system should be, what height difference must be overcome, how the passenger transport system should be connected to supporting structures within the building, and the like. Customer-specific configuration data can also include customer wishes with regard to functionality, conveying capacity, optics, etc. The data for the digital-double dataset can be present, for example, as a CAD dataset which, among other things, reproduces geometric dimensions as characterizing properties and/or other characterizing properties of the components forming the passenger transport system.

The production-specific data typically relate to properties or specifications within a manufacturing plant or production line, in which the passenger transport system is to be manufactured. For example, depending on the country or location, in which a production factory is located, different conditions can prevail in the production factory and/or different specifications may have to be met. For example, specific materials, raw materials, raw components, or the like may not be available or may not be processed in some production factories. In some production factories, machines can be used that are not available in other production factories. Due to their layout, some production factories are subject to restrictions with regard to the passenger transport systems to be produced or the components thereof. Some production factories allow for a high degree of automated production, whereas other production factories use manual production, for example, due to low labor costs. There may be a multitude of other conditions and/or specifications, by which production environments can differ. All of these production-specific data typically have to be taken into account when planning or commissioning a passenger transport system because it can depend on said data, how a passenger transport system can actually be built. It may be necessary to fundamentally modify the initially created digital-double dataset, which only took into account the customer-specific configuration data, in order to be able to take the production-specific data into consideration.

Static and/or dynamic simulations are preferably already carried out when the digital-double dataset is created, and the commissioning digital-double dataset is created taking into account results of the simulations. One of these dynamic simulations can be, for example, a starting behavior for an escalator. In this case, all friction forces as well as clearances and the properties dependent on the drive motor are simulated from standstill to nominal speed. With these simulations, collision-critical points can be checked and the dynamic forces acting on the individual components or component model datasets can be determined during starting.

In other words, for creating the digital-double dataset, which, taking into account the customer-specific configuration data, forms the basis of the commissioning digital-double dataset, simulations can be carried out, with which static and/or dynamic properties of the commissioned passenger transport system are simulated. Simulations can be performed, for example, in a computer system.

In this case, static simulations analyze, for example, a static interaction of a plurality of assembled components. With the help of static simulations, it is possible to analyze, for example, whether complications can arise during assembly of a plurality of predefined components or components case-suitably specified on the basis of component model datasets, for example, because each of the components is manufactured with specific manufacturing tolerances, so that an unfavorable accumulation of manufacturing tolerances can lead to problems.

The aforementioned dynamic simulations during the creation of the digital-double dataset analyze, for example, a dynamic behavior of components during the operation of the assembled passenger transport system. Using dynamic simulations, it is possible to analyze, for example, whether moving components, particularly the continuously arranged components, are displaced within a passenger transport system in a desired manner or whether there is, for example, a risk of collisions between components moving relative to one another.

From the foregoing, it can be seen that initially only target data based on the data determined during the planning or commissioning of the passenger transport system are stored in the commissioning digital-double dataset. These target data can be obtained, among others, if, for example, computer-assisted commissioning tools are used to calculate the characterizing properties of a passenger transport system to be produced on the basis of customer-specific configuration data. For example, data relating to target dimensions, target numbers, target material properties, target surface property, etc. of components to be used in the production of the passenger transport system can be stored in the commissioning digital-double dataset.

The commissioning digital-double dataset thus represents a virtual image of the passenger transport system in its planning phase or commissioning phase, e.g., before the passenger transport system is actually produced and installed using the commissioning digital-double dataset.

Proceeding from the commissioning digital-double dataset, the target data contained therein can then be successively replaced by actual data as production progresses, and a finalization digital-double dataset can be generated. In this case, the actual data indicate characterizing properties of the components of the passenger transport system, initially only defined with regard to their target configuration, in their actual configuration immediately after assembly and installation of the passenger transport system in the structure. The actual data can be ascertained by manual and/or mechanical measuring of the characterizing properties of the components. Separate measuring devices and/or sensors integrated in components or arranged on components can be used for this purpose.

The finalization digital-double dataset thus represents a virtual image of the passenger transport system immediately after its completion, e.g., after the assembly of the components and the installation in the structure.

As already mentioned above, a detection device is provided for at least one of the physical escalator steps or pallets of a physical passenger transport system. At least one of the physical escalator steps or pallets of the conveyor belt of the physical passenger transport system can have an identification. The detection device can furthermore comprise an identification and receiver module for detecting the identifications, wherein the identification and receiver module is to be arranged in a stationary manner in the physical passenger transport system. In this way, it can be determined exactly, at which point or points abnormal changes in position and accelerations occur on the guide path of the continuous conveyor belt.

In this case, the measurement data of the detection device, which were detected when the transport system was put into operation or after its maintenance and repair, are preferably used as basic measurement data. The measurement data detected by the detection device can now be compared with this basic measurement data. Proceeding from the basic measurement data, the guide path can be remodeled by updating the corresponding characterizing properties of the component model datasets involved. This means that, for example, the geometric coordinates of a guide rail component model dataset, which are present as characterizing properties, are changed at a certain point such that its track has a "hump" which causes the same accelerations and changes in position on the virtual escalator step during the dynamic simulation as they are detected by the detection device on the physical escalator step or pallet of the physical conveyor belt.

A detection device can naturally also be provided for a plurality of physical escalator steps or pallets or for each physical escalator step or pallet. The more detection devices are present, the more precisely and quickly warpings in the guide path can be detected, and potential collisions can be detected using simulations on the UDDD before damage occurs to the physical passenger transport system.

When the physical passenger transport system is started up, its finalization digital-double dataset is supplemented in the UDDD with the hereto accumulating operating data and operating adjustment data. During the subsequent operation of the passenger transport system, the UDDD can be updated continuously or at suitable intervals. For this purpose, the data initially stored in the UDDD are modified during operation of the passenger transport system such that changes in the characterizing properties of the components forming the passenger transport system, which were calculated on the basis of changes in position and accelerations detected by the detection device, are taken into account.

The UDDD represents a very precise virtual image of the passenger transport system during its operation, and takes into account, for example, wear-related changes when compared to the characterizing properties originally measured immediately after completion, and can thus be used as a UDDD for continuous or repeated monitoring of the properties of the passenger transport system.

However, it is not absolutely necessary for all of the characterizing properties of a component present as target data to be updated by actual data of the component or by the characterizing properties calculated on the basis of the load profile. As a result, the characterizing properties of most components of a finalization digital-double dataset and of the resulting UDDD are characterized by a mixture of target data, actual data, and calculated data.

Specific embodiments of how a UDDD can be created for an escalator or moving walkway and how the state of the escalator or moving walkway can be monitored on the basis thereof shall be described below with reference to preferred embodiments.

Embodiments of the method presented herein for monitoring the state of a passenger transport system can be carried out using a device specifically configured for such purpose. The device can comprise one or more computers. In particular, the device can be formed from a computer network which processes data in the form of a data cloud. For this purpose, the device can have a storage device, in which the data of the UDDD can be stored, for example, in electronic or magnetic form. In addition, the device can have data processing options. For example, the device can have a processor which can be used to process data of the UDDD. The device can furthermore have interfaces, via which data can be input into the device and/or output from the device. In particular, the device can have a detection device which is arranged on or in at least one escalator step or pallet of the physical conveyor belt of the passenger transport system and by means of which accelerations and changes in position can be detected in all three axes. In principle, the device can be part of the passenger transport system. However, the device, or parts thereof, is preferably not arranged in the passenger transport system, but instead remotely from it, for example, in a remote control center, from which the state of the passenger transport system is supposed to be monitored. The device can also be implemented in a spatially distributed manner, for example, if data distributed over a plurality of computers are processed in a data cloud.

In particular, the device can be programmable, e.g., it can be prompted by a suitably programmed computer program product to execute or control the method according to the disclosure. The computer program product can contain instructions or codes which, for example, prompt the processor of the device to store, read, process, modify, etc. data of the digital-double dataset. The computer program product can be written in any computer language.

The computer program product can be stored on any computer-readable medium, for example, a flash memory, a CD, a DVD, RAM, ROM, PROM, EPROM, etc. The computer program product and/or the data to be processed with it can also be stored on a server or a plurality of servers, for example, in a data cloud, from where the data can be downloaded via a network, for example, the internet.

Finally, it must be noted that some of the possible features and advantages of the disclosure are described herein with reference to different embodiments of both the proposed method and the correspondingly designed device for monitoring properties of a passenger transport system. A person skilled in the art knows that the features can be combined, transferred, adjusted, or exchanged in a suitable manner in order to arrive at further embodiments of the disclosure.

BRIEF DESCRIPTION OF THE DRAWINGS

In the following, embodiments of the disclosure shall be described with reference to the accompanying drawings, wherein neither the drawings nor the description should be construed as limiting the disclosure.

The figures are merely schematic and not true to scale. Identical reference signs denote identical or identically acting features in the different figures.

DETAILED DESCRIPTION

Figure 1:
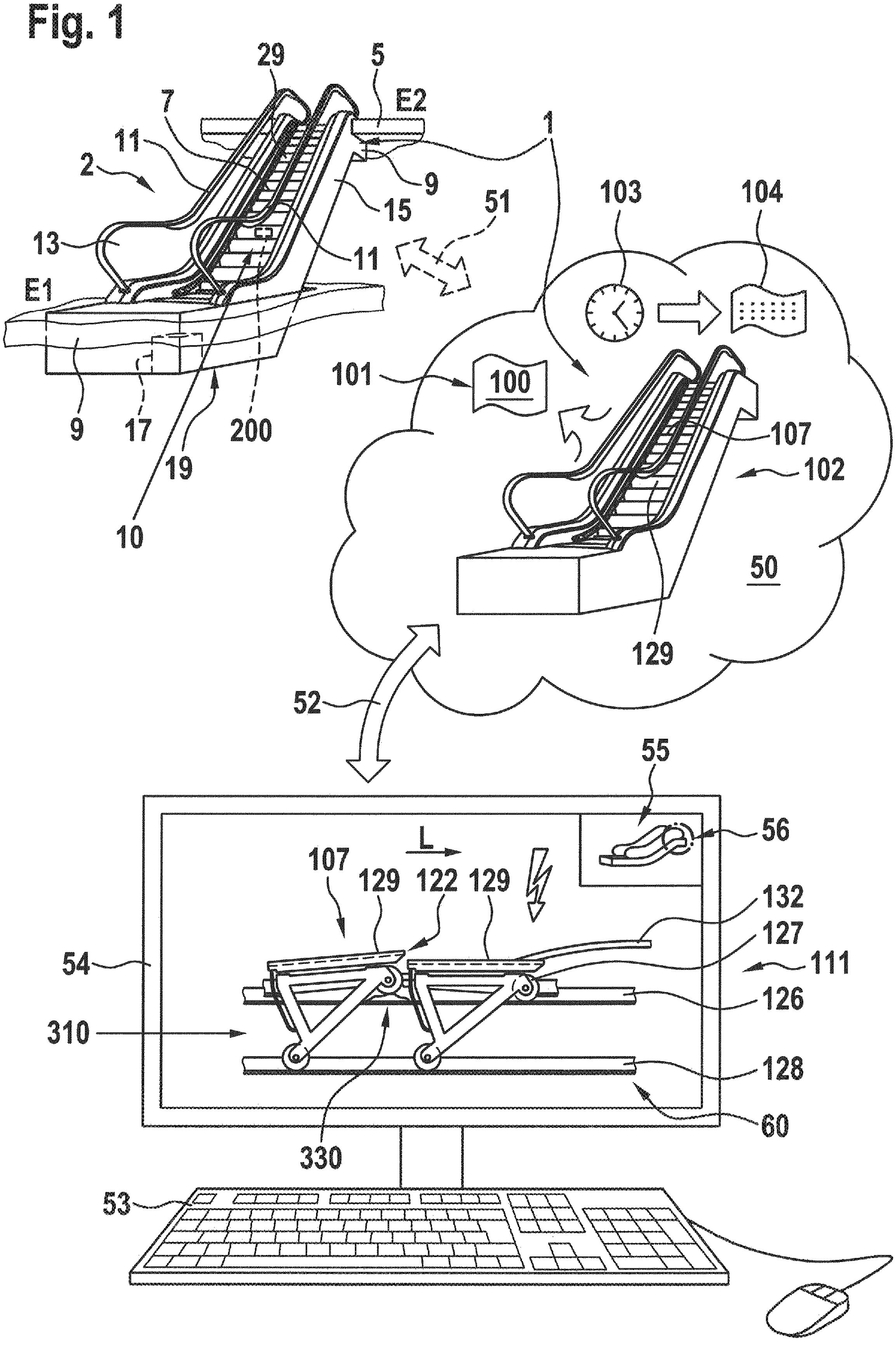
FIG. 1 shows a device according to the disclosure, having a detection device arranged in a physical passenger transport system designed as an escalator, and an updated digital-double dataset (UDDD) which images the physical passenger transport system and is stored in a data cloud, and with which device the method according to the disclosure can be carried out.

FIG. 1 shows a device 1 according to the disclosure, comprising a detection device 200 which is arranged in a physical passenger transport system 2 and an updated digital-double dataset (UDDD) 102 of the physical passenger transport system 2, which is stored in a data cloud 50, wherein a method 100 according to the disclosure can be carried out using the device 1.

The physical passenger transport system 2 shown in FIG. 1 is configured in the form of an escalator and connects levels E1 and E2 which are located at different heights and spaced apart from one another horizontally in a structure S. Using the physical passenger transport system 2, passengers can be conveyed between the two levels E1 and E2. The physical passenger transport system 2 rests at its opposing ends on support points 9 of the structure 5.

The physical passenger transport system 2 further comprises a support structure 19, shown only in its outline, which receives all further components of the physical passenger transport system 2 in a load-bearing manner. This includes statically arranged physical components, such as guide rails 25, 26, 27, 28 (see FIG. 2), the hardware of a controller 17 with implemented control software, as well as well-known components (not depicted), such as a drive motor, a drive train, drive chain sprockets driven by the drive motor via the drive train, a deflection arc, and the like. The physical passenger transport system 2 further comprises balustrades 13 arranged on its two longitudinal sides above and on the support structure 19. In the following, FIGS. 1 and 2 shall be described jointly.

Furthermore, the physical passenger transport system 2 also has continuously arranged components 7, 11 which are naturally subject to changes in position and accelerations during operation. In particular, they include a conveyor belt 7, which is arranged continuously between the two levels E1, E2 in the support structure 19 along a guide path 10 (only the guide path of the forward run can be seen), two handrails 11 or handrail straps which are arranged continuously on the balustrades 13, and the components (not depicted) of the drive train, which transfer the movements of the drive motor to the conveyor belt 7 and the handrails 11. The conveyor belt 7 comprises escalator steps 29 and conveyor chains 31 as well as a multiplicity of further components, such as step rollers 32, chain rollers 33, step axles 34, and the like.

Alternatively, the physical passenger transport system 2 can also be configured as a moving walkway (not depicted) which, in terms of many of its components, is constructed similarly or identically to the physical passenger transport system 2 depicted as an escalator.

As FIG. 1 shows, many components of the physical passenger transport system 2, such as the support structure 19, the guide rails 25, 26, 27, 28, the entire drive train, the drive chain sprockets and the deflection arcs, the electrical equipment, such as power and signal lines, sensors, and the controller 17, are covered and protected by covering components 15 and are therefore not visible from the outside. FIG. 1 also only shows part of the escalator steps 29 of the forward run, which is accessible by passengers, of the conveyor belt 7.

Figure 2:
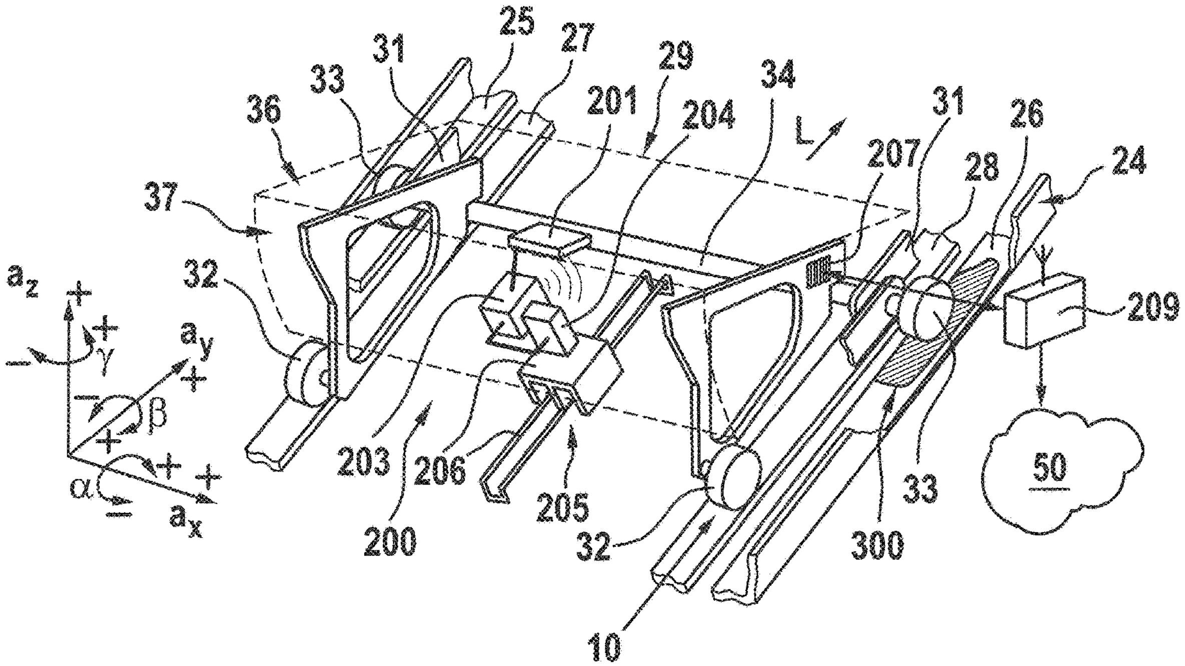
FIG. 2 schematically shows an escalator step of the escalator from FIG. 1 in a three-dimensional view, wherein its step element and setting element are only indicated in order to better illustrate the arrangement of the detection device in the escalator step.

FIG. 2 shows the detection device 200 in more detail in a three-dimensional view, wherein the step element 36 and the setting element 37 of the escalator step 29 is only indicated in order to better show the arrangement of the elements of the detection device 200 in the escalator step 29. The detection device 200 essentially comprises a sensor element 201, a signal processing and signal transmission module 203, an energy supply module 205, an identification device 207, and an identification and receiver module 209.

The sensor element 201 can be, for example, an MPU-6050 sensor that contains a three-axis MEMS accelerometer and a MEMS gyroscope or gyroscope in a single chip. As shown schematically outside the escalator step 29, this chip measures accelerations $a_x$, $a_y$, $a_z$ and changes in position $\alpha$, $\beta$, $\gamma$ very precisely in all three axes x, y, z because a 16-bit analog-digital conversion hardware is present for each channel. Of course, other sensor elements 201 or a plurality of sensor elements 201 can also be used which, as indicated in FIG. 2, collectively detect accelerations $a_x$, $a_y$, $a_z$ and changes in position α, β, γ in all three axes x, y, z and output them as measurement data.

The energy supply module 205 has an energy storage device 204 and a contactless energy transmission device 206, which transmits electrical energy via an induction loop and can thus charge the energy storage device 204. The energy storage device 204 can be an accumulator, a capacitor, or the like.

The identification device 207 can be a simple label with a matrix code or barcode. However, an RFID tag is particularly advantageous because it is very robust and functionally reliable. Both passive and active RFID tags can be used, wherein the active RFID tag must have an electrical connection to an energy storage device, for example, to the energy storage device 204 of the detection device 200. All escalator steps 29 of the conveyor belt 7 can be provided with an identification device 207, not only the depicted escalator step 29 with the detection device 200.

The identification and receiver module 209 is matched in a suitable manner with the identification device 207 and identifies the escalator steps 29 currently moving past it. Position information as to which escalator step 29 is currently in the detection area of the identification and receiver module 209 is generated accordingly. This allows for the respective measurement data of the occurring accelerations $a_x$, $a_y$, $a_z$ and changes in position α, β, γ to be assigned precisely to the point on the guide path 10, at which they occurred.

If all escalator steps 29 have an identification device 207, the identification and receiver module 209 can also serve as a missing step detector because the sequence of the identification devices 27 can also be stored in the identification and receiver module 209. If an escalator step 27 is missing, the identification and receiver module 209 immediately transmits a warning signal to the controller 17 of the physical passenger transport system 2 and the physical conveyor belt 7 is locked.

The identification and receiver module 209 can also receive, and possibly process (for example, filter out certain operation-related frequencies), the measurement data of the accelerations $a_x$, $a_y$, $a_z$ and changes in position α, β, γ determined by the detection device 200 and forward them to the data cloud 50 and/or the controller 17. The identification and receiver module 209 can naturally also be present in two separate units.

Figure 3:
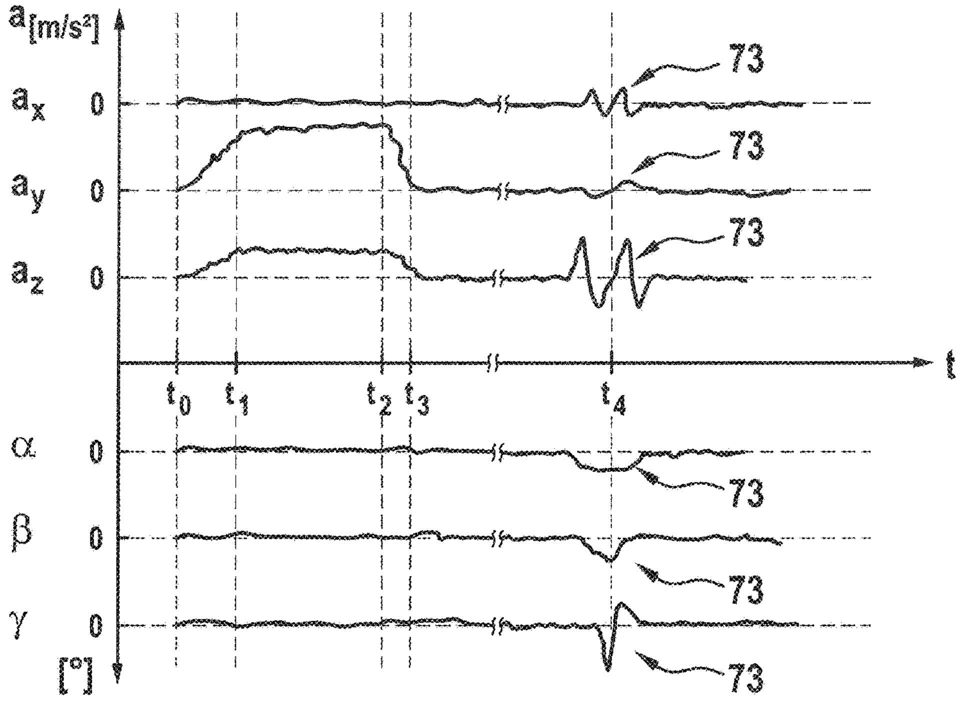
FIG. 3 schematically shows a possible profile of the measurement data which were detected by the detection device shown in FIG. 2 during a displacement of the escalator step along its guide path.

For a better understanding of the function of the detection device 200, a deposit 300 is shown on the right guide rail 26 of the chain roller 33, over which the chain roller 33 currently rolls. In order to make said deposit 300 more noticeable, a piece of the guide rail 26 is shown broken away. This deposit 300 can be firmly pressed dirt, but it can also be an object pulled into the physical passenger transport system 2, for example, a sandal or a piece of cloth. As soon as the chain roller 33 rolls over the deposit 300, this corner of the escalator step 29 rises. In addition, due to the one-sided resistance of the deposit 300, the escalator step 29 deflects to the right when it moves in the direction of travel L. As a result of the deflection, the chain roller 33 strikes the guide flank 24 of the guide rail 26 and is thrown back by it. In FIG. 3, this event is also evident from the measurement data for the accelerations $a_x$, $a_y$, $a_z$ and changes in position α, β, γ at the time $t_4$.

FIG. 3 shows a diagram of the measurement data detected by the detection device 200 or the measured value profiles because the measurement data are plotted over a time axis t. The measurement data of the accelerations $a_x$, $a_y$, $a_z$ for the corresponding axes x, y, z are plotted above the time axis t, and the measurement data of the changes in position α, β, γ, or more precisely, the angles of the changes in position about the respective axis x, y, z, are plotted below the time axis t.

The escalator is started at time to, e.g., the physical conveyor belt 7 and thus the escalator step 29 are accelerated in the direction of travel L until the nominal speed is reached. The acceleration of the escalator step 29 is reproduced both in the measurement data of the x-axis and in the z-axis because the escalator step 29 with the detection device 200 is located in the inclined part of the guide path 10. The measurement data of these accelerations $a_x$, $a_z$ therefore increase until time $t_1$ and are kept constant until time $t_2$, as a result of which the conveyor belt 7 accelerates uniformly. Starting at time $t_2$, the acceleration is reduced because at time $t_3$, the nominal speed of the conveyor belt 7 is reached. During this phase, there is no significant change in position.

When the chain roller 33 rolls over the deposit 300 at time $t_4$, it becomes evident from all six measured value profiles as the peak 73. In the z-axis, the acceleration $a_z$ increases when the chain roller rolls up and down, so that the measured value profile shows two "camel humps." As a result of the deflection and the impact of the escalator step 29 on the guide flank 24, a two-time increase in the corresponding acceleration measurement data $a_x$ can also be seen in the x-axis. In the y-axis, the resistance of the deposit 300 initially causes a slight deceleration with subsequent acceleration to the nominal speed.

Since the chain roller 33 is first raised when rolling over the deposit 300 and then lowered again to the level of the guide rail, the escalator step 29 tilts up during the roll-over, which can be clearly seen from the detected measurement data which represent the change in position α about the x-axis. However, the escalator step 29 is also tilted, so that a change in position with respect to the y-axis P is also detectable. Also of interest is the profile of the measurement data on the change in position γ about the z-axis, which clearly document the deflection of the escalator step 29 up to the impact of the chain roller 33 on the guide flank 24 and the subsequent resetting of the escalator step 29, due to the tensile force on the conveyor chains 31, to the intended guide path 10 of the chain roller 33. However, as shown in FIG. 1, static and dynamic simulations can also be carried out with the accelerations $a_x$, $a_y$, $a_z$ and changes in position α, β, γ.

For this purpose, the device 1 according to FIG. 1 also comprises the updated digital-double dataset 102, referred to in the following as UDDD 102 for better readability. The UDDD 102 is a virtual image that is as comprehensive as possible and tracks the current physical state of the physical passenger transport system 2 and therefore represents a virtual passenger transport system assigned to the physical passenger transport system 2. This means that the UDDD 102 is not just a virtual envelope model of the physical passenger transport system 2, roughly representing its dimensions, but also includes and images in digital form in the UDDD 102 every single physical component, from the handrail 11 to the last screw, with as many of its characterizing properties as possible.

The characterizing properties of components can be geometric dimensions of the components, for example, a length, a width, a height, a cross-section, radii, fillets, etc. The surface quality of the components, for example, roughnesses, textures, coatings, colors, reflectivities, etc., is also part of the characterizing properties. Furthermore, material values, for example, the modulus of elasticity, bending fatigue strength value, hardness, notched impact strength value, tensile strength value and/or the degrees of freedom which describe the possible relative movements of a component to adjacent components, etc., can also be stored as characterizing properties of the respective component. In this case, these are not theoretical properties (target data) such as those found on a production drawing, but rather characterizing properties actually determined on the physical component (actual data). Assembly-relevant specifications, such as the actually applied tightening torque of a screw, and thus its pretensioning force, are preferably also assigned to the respective component.

The device 1 can comprise, for example, one or more computer systems 111. In particular, the device 1 can comprise a computer network which stores and processes data in the form of a data cloud 50. For this purpose, the device 1 can have a storage device or, as shown symbolically, storage resources in the data cloud 50, in which the data of the UDDD 102 (symbolically depicted as a three-dimensional image of the physical passenger transport system 2) can be stored, for example, in electronic or magnetic form. This means that the UDDD 102 can be stored in any storage location.

The device 1 can also have data processing options. For example, the device 1 can have a processor which can be used to process data of the UDDD 102. The device 1 can furthermore have interfaces 53, 54, via which data can be input into the device 1 and/or output from the device 1. In particular, the device 1 can have internal interfaces 51, 52, wherein the interface 51 between the UDDD 102 and the physical passenger transport system 2 allows for communication to the detection device 200 which is arranged on or in the passenger transport system 2 and by means of which changes in position α, β, γ and accelerations $a_x$, $a_y$, $a_z$ of at least one escalator step 29 can be measured and determined.

In principle, the device 1 can be realized in its entirety in the physical passenger transport system 2, wherein its UDDD 102 is stored, for example, in its controller 17 and the data of the UDDD 102 can be processed by the controller 17. However, the UDDD 102 of the device 1 is preferably not stored in the physical passenger transport system 2, but instead remotely from it, for example, in a remote control center, from which the state of the physical passenger transport system 2 is supposed to be monitored, or in the data cloud 50 which can be accessed from anywhere, for example, via an internet connection. The device 1 can also be implemented in a spatially distributed manner, for example, if data of the UDDD 102 distributed over a plurality of computers are processed in a data cloud 50.

In particular, the device 1 can be programmable, e.g., it can be prompted by a suitably programmed computer program product 101, comprising the UDDD 102, to execute or control the method 100 according to the disclosure. The computer program product 101 can contain instructions or codes which, for example, prompt a processor of the device 1 to store, read, process, modify, etc., data of the UDDD 102 according to the implemented method 100. The computer program product 101 can be written in any computer language.

The computer program product 101 can be stored on any computer-readable medium, for example, a flash memory, a CD, a DVD, RAM, ROM, PROM, EPROM, etc. The computer program product 101 and/or the data to be processed with it can also be stored on a server or a plurality of servers, for example, in a data cloud 50, from where the data can be downloaded via a network, for example, the internet.

Based on the data present in the UDDD 102, the latter or its virtual components can be called up by executing the computer program product 101 in a computer system 111 and displayed as a three-dimensional, virtual passenger transport system. By means of zoom functions and movement functions, it is possible to "wander through" said virtual passenger transport system and explore it virtually. For this purpose, movement sequences, collision simulations, static and dynamic strength analyses using the finite element method, and interactive queries on current characterizing properties of individual virtual components and component groups are also possible. This means that, for example, the virtual continuously arranged conveyor belt 107, which represents the counterpart of the physical conveyor belt 7, can be selected from the UDDD 102. It can be used to carry out simulations, wherein the measurement data detected by the detection device 200 relating to changes in position α, β, γ and accelerations $a_x$, $a_y$, $a_z$ are transmitted in the simulations to the corresponding virtual escalator step 129 of the virtual conveyor belt 107.

In other words, these simulations can be initialized in an automated manner by the method 100 implemented in the computer program product 101. However, they can also be initialized from "outside," e.g., via an input, for example, via the interface 53 of the computer system 111 depicted as a keyboard. The measurement data are transmitted via the interface 51 between the physical passenger transport system 2 and the UDDD 102 or the running computer program (method 100) of the computer program product 101. For this purpose, the measurement data of the detection device 200 (see also FIGS. 2 and 3) are queried and the accelerations $a_x$, $a_y$, $a_z$ and changes in position α, β, γ according to the assignment information of the identification and receiver module 209 are transmitted to the movements of the corresponding component model datasets or the corresponding virtual escalator steps 129. The measurement data or entire measurement data profiles can be stored in a log file 104. In order to sort these entries historically, said entries can be stored in the log file 104 with time information 103.

As shown schematically in FIG. 1, a user, for example, a technician, can query the state of the physical passenger transport system 2 by starting or accessing the computer program 100 of the computer program product 101 via the computer system 111. The computer system 111 can be an inherent component of the device 1, but it can also assume a merely temporary affiliation while it is used to access data of the UDDD 102 via the interface 52.

In the present embodiment of FIG. 1, a technician was made aware of problems in the region of the upper level E2 on the basis of automatically generated messages and warning notices. Since the physical conveyor belt 7 had been running for some time, this region attracted attention due to an automated, periodic comparison of the measured values of the detection device 200 because the measured values of the accelerations $a_x$, $a_y$, $a_z$ and changes in position α, β, γ, as shown in FIG. 3 at time $t_4$, differ significantly from the measured values otherwise to be expected at this point on the guide path 10, such as are present, for example, after time $t_3$. These peaks 73, which differ from the original measured values detected during startup, are therefore ideally suited for being monitored automatically.

In order to follow up on the warning notices, the technician has selected a region 60 of the UDDD 102 via zoom functions. In this case, a small navigation graphic 55 can be displayed on the screen 54 which acts as data output and on which the selected region 60 is indicated using a pointer 56. The selected region 60 is the virtual access region present in level E2, in which the virtual escalator steps 129 enter below the virtual comb plate 132 arranged therein. Due to the zoomed region 60, only the virtual guide rails 126, 128, the virtual comb plate 132, and two virtual escalator steps 129 of the conveyor belt 107 can be seen.

Dynamic simulations on the UDDD 102 can be used to evaluate the effects of the deviating measurement data, for example, by modifying the virtual guide path 310 such that a virtual escalator step 129 traveling over said guide path 310 is subject to the same accelerations $a_x$, $a_y$, $a_z$ and changes in position α, β, γ as the physical escalator step 29.

Specifically, the virtual guide path 310 is remodeled, for example, by adding a virtual deposit 330 to the virtual guide rail 126 at the correct location. By means of the measured value history stored in the log file 104, it is also possible to simulate whether the virtual deposit 330 migrates to the virtual comb plate 132. In these simulations, the virtual escalator steps 129 rise and drop in a direction orthogonal to the direction of travel L when the virtual chain rollers 127 travel over the deposit 330. If the virtual deposit 330 moves toward the virtual comb plate 132, the leading edge 122 of the virtual escalator step 129 can collide with the virtual comb plate 132. The same is logically to be feared with the physical passenger transport system 2, which is why maintenance of the physical passenger transport system 2 should be initiated on the basis of the simulation results described above.

It is also possible that the deposit is ground away by the chain rollers rolling over it and the measured values of the detection device thus become smaller and smaller, so that the technician recognizes from the simulations on the UDDD 102 that the problem will solve itself and that no maintenance intervention is required.

If the deposit moves in the direction of the comb plate, a suitable simulation extrapolation based on the measured value history can be used to determine the time of a possible damage event and preventive maintenance can be planned and carried out prior to said time. In order to limit the accumulating amount of data, a traceable history can also be limited to a time window, wherein the measurement data recorded during startup must be retained as reference values.

After maintenance, the deposit 300 is logically no longer present, so that the accelerations $a_x$, $a_y$, $a_z$ and changes in position α, β, γ at this point on the guide path 10 again correspond approximately to the measured values that were detected by the detection device 200 when the physical escalator 2 was started up. In accordance with the now current accelerations $a_x$, $a_y$, $a_z$ and changes in position α, β, γ, the virtual guide path 310 is remodeled or the UDDD 102 is updated accordingly.

For reasons of the manufacturing tolerances of the components and due to the adjustments made during the manufacture and/or startup and/or during previous maintenance, not every physical passenger transport system 2 has the exact same geometric conditions with regard to the components and their installation position. Strictly speaking, each physical passenger transport system is unique in the totality of the characterizing properties of its components and accordingly, all UDDDs 102 differ (even if only slightly) from one another. In the region 60 selected by way of example, this results in the fact that a specific change in position detected by the detection device 200 can lead, in one physical passenger transport system 2, to a collision of the escalator step 29 and the comb plate, while in another physical passenger transport system 2 of the same design, there is no risk of a collision for quite some time. This example makes it easy to see that, due to the analysis options offered by the UDDD 102 with its virtual components, for each physical component of a passenger transport system 2, its further use, its adjustment in its environment, or its replacement can be determined using the UDDD 102, and appropriate maintenance work can be planned.

Figure 4:
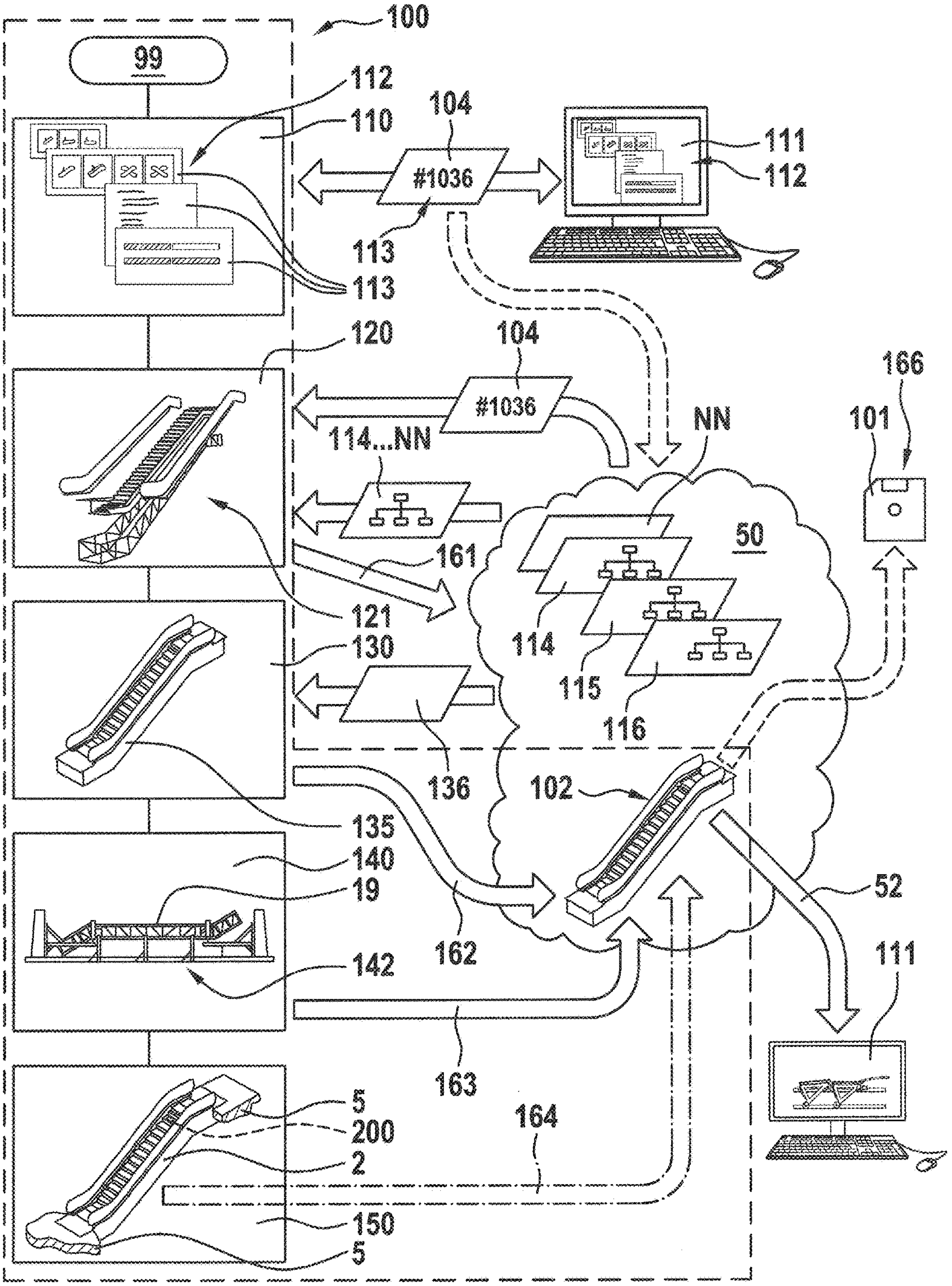
FIG. 4 illustrates a creation of an updated digital-double dataset (UDDD) and the production of a physical passenger transport system as well as its startup and the continuous updating of the UDDD from configuration to operation of the physical passenger transport system.

Using a diagram provided with additional information, FIG. 4 illustrates the most important method steps of the method 100 according to the disclosure (indicated by a broken line) for creating a UDDD 102, for producing a physical passenger transport system 2 as part of said creation, for the startup of the physical passenger transport system 2, and for updating the UDDD 102 based on the detected accelerations $a_x$, $a_y$, $a_z$ and changes in position α, β, γ. The main method steps of the method 100 are:

In the first method step 110, detecting the customer-specific configuration data 113;

in the second method step 120, creating a commissioning digital-double dataset, including component model datasets and the customer-specific configuration data 113;

in the third method step 130, transferring the commissioning digital-double dataset to a production digital-double dataset;

in the fourth method step 140, producing the physical passenger transport system 2 using the production digital-double dataset; and in the fifth method step 150, installing the physical passenger transport system 2 in a structure 5 and updating the UDDD 102 with the production digital-double dataset.

All data processing and data storage, as well as the step-by-step creation of the UDDD 102, takes place, for example, via the data cloud 50.

The starting position 99 for executing the method 100 according to the disclosure can be a planning and subsequent construction or a rebuilding of a structure 5, for example, a shopping center, an airport building, a subway station, or the like. For this purpose, a passenger transport system 2 configured as an escalator or a moving walkway is optionally also provided. The desired passenger transport system 2 is configured on the basis of the application profile and installation conditions.

For example, an internet-based configuration program which is permanently or temporarily installed in a computer system 111 can be available for this purpose. Using different input masks 112, customer-specific configuration data 113 are queried and stored in a log file 104 under an identification number. The log file 104 can be stored, for example, in the data cloud 50. Using the customer-specific configuration data 113, the architect of the structure 5 can optionally be provided with a digital envelope model which said architect can integrate into the digital building model for the purpose of visualizing the planned building. For example, coordinates of the intended installation space, the required maximum conveying capacity, conveying height, operating environment, etc., are queried as customer-specific configuration data 113.

If the architect is satisfied with the configured passenger transport system 2, said architect can order it from the manufacturer by specifying the customer-specific configuration data 113, for example, by referring to the identification number or the identification code of the log file 104.

When an order is received, represented by the second method step 120, which is referenced to a log file 104, a digital-double dataset 121 specifying a target configuration is initially created. When creating the digital-double dataset 121, component model datasets 114, 115, . . . , NN are used which are provided for manufacturing the physical components. This means that for each physical component, a component model dataset 114, 115, . . . , NN is stored, for example, in the data cloud 50 and contains all the characterizing properties (dimensions, tolerances, material properties, surface quality, interface information for further component model datasets, etc.) for this component in a target configuration.

By means of the customer-specific configuration data 113, the component model datasets 114, 115, . . . , NN required for creating the digital-double dataset 121 are now selected in an automated manner using logical operations, and their number and arrangement in three-dimensional space are determined. These component model datasets 114, 115, . . . , NN are subsequently combined using their interface information to form a corresponding digital-double dataset 121 of the passenger transport system 2. In this case, it is obvious that an escalator or moving walkway consists of several thousand individual parts (denoted by the reference signs . . . , NN) and consequently just as many component model datasets 114, 115, . . . , NN must be used and processed for creating a digital-double dataset 121. The digital-double dataset 121 has target data for all physical components to be manufactured or procured, said target data representing characterizing properties of the components required to construct the passenger transport system 2 in a target configuration. As illustrated by arrow 161, the digital-double dataset 121 can be stored in the data cloud 50 and to a certain extent also forms the starting point for the UDDD 102.

In the third method step 130, the commissioning digital-double dataset 135, which contains all the production data required for producing the commissioned passenger transport system 2, is created by supplementing the digital, three-dimensional double dataset 121 with production-specific data 136. Such production-specific data 136 can include, for example, the production location, the material that can be used at said production location, the production means used to produce the physical component, throughput times, and the like. As illustrated by arrow 162, this supplementing step is carried out during the creation of the UDDD 102.

According to the fourth method step 140, the commissioning digital-double dataset 135 can subsequently be used in the production facilities 142 of the manufacturing plant (herein represented by a welding template for a support structure 19) to enable production of the physical components (represented by a support structure 19) of the physical passenger transport system 2. The assembly steps for the physical passenger transport system 2 are also defined in the commissioning digital-double dataset 135. During and after the manufacture of the physical components and during the assembly of the resulting physical passenger transport system 2, at least some of the characterizing features of components and assembled component groups are detected, for example, using measurements and non-destructive testing methods, and assigned to the corresponding virtual components and transmitted to the still incomplete UDDD 102. The actual data measured on the physical components replace the assigned target data of the commissioning digital-double dataset 135 as the characterizing properties. With this transmission, illustrated by arrow 163, the commissioning digital-double dataset 135 increasingly becomes the UDDD 102 as production progresses. However, it is still not entirely complete; instead, it first forms a so-called finalization digital-double dataset.

As shown in the fifth method step 150, after its completion, the physical passenger transport system 2 can be installed in the structure 5 according to the plans of the architect. Since certain adjustment work has to be carried out during installation and operating data are generated during the initial startup (also, for example, the accelerations $a_x$, $a_y$, $a_z$ and changes in position α, β, γ detected by the detection device 200 along the guide path 10), these data are also transmitted to the finalization digital-double dataset and converted into characterizing properties of the virtual components concerned. With this update, illustrated by the dot-dashed arrow 164, the finalization digital-double dataset becomes the UDDD 102, and, similar to the physical passenger transport system 2, reaches full operational readiness. From that point on, the UDDD 102 can be loaded into the computer system 111 at any time and used for detailed analysis of the state of the physical passenger transport system 2.

The fifth method step 150, however, does not form an actual completion of the method 100 according to the disclosure because the UDDD 102 is consistently updated during its service life. This completion does not occur until the end of the service life of the physical passenger transport system 2, wherein, in this case, the data of the UDDD 102 can be used beneficially for one last time for the process of disposing of the physical components.

As described in detail above and symbolized by the dot-dashed arrow 164, the UDDD 102 is updated continuously and/or periodically throughout the entire service life of the passenger transport system 2 by the transmission of measurement data. As already mentioned, said measurement data can be detected both by the detection device 200 and by an input, for example, by maintenance personnel, and transmitted to the UDDD 102. Together with the program instructions 166 required for working with the UDDD 102, the UDDD 102 can naturally be stored in any storage medium as computer program product 101.

Although the present disclosure was described in detail in FIG. 1 through 4 using the example of an escalator, it is obvious that the described method steps and a corresponding device can similarly also be applied to moving walkways. Finally, it must be noted that terms such as "having," "comprising," etc. do not preclude other elements or steps, and terms such as "a" or "an" do not exclude a plurality of elements or steps. It must further be noted that features or steps that have been described with reference to one of the above embodiments can also be used in combination with other features or steps of other embodiments described above. Reference signs in the claims should not be considered limiting.

The invention claimed is:

1. A method for monitoring a state of a physical passenger transport system using an updated digital-double dataset UDDD which comprises characterizing properties of components of the physical passenger transport system in a machine-processable manner, the method comprising:

assembling the UDDD from component model datasets comprising data which were determined by measuring the characterizing properties of the physical passenger transport system after it was assembled and installed in a structure, wherein the physical passenger transport system comprises a continuously arranged conveyor belt comprising escalator steps or pallets, wherein at least one escalator step or pallet comprises a detection device, the detection device configured to detect accelerations and changes in position detected in all three axes during operation of the physical passenger transport system and output the detected accelerations and changes in position as measurement data;

transmitting the measurement data to the UDDD; and determining, forces, impulses and vibrations resulting from the measurement data, which act on virtual components of a virtual conveyor belt, corresponding to the physical components, and on the virtual components which interact with the virtual conveyor belt, using dynamic simulations on the UDDD;

evaluating the forces, impulses and vibration resulting from the measurement data using the dynamic simulations on the UDDD to send a signal to the controller of the physical passenger transport system to lock the conveyor belt upon determining a risk of collision or that at least one of the escalator steps or the pallets of the physical passenger transport system is missing using the dynamic simulations on the UDDD.

2. The method of claim 1, wherein the measurement data of the accelerations and changes in position transmitted by the detection device are stored with time information in a log file.

3. The method of claim 2, wherein, based on the measurement data of the accelerations and changes in position stored in the log file as well as operating data stored in the log file, a change trend in the measurement data can be determined using stochastic methods.

4. The method of claim 3, wherein the monitoring of the state of the physical passenger transport system comprises a simulation of future characterizing properties of the physical passenger transport system using the UDDD and is based on change trends of the accelerations and changes in position.

5. The method of claim 1, wherein the accelerations and changes in position detected by the detection device are examined for periodically occurring peaks and, in the event of the periodically occurring peaks, are assigned to a point on a guide path of the physical conveyor belt or, after the transmission of the measurement data to the UDDD, assigned to a point of a virtual guide path.

6. The method of claim 1, further comprising a creating the UDDD, wherein creating the UDDD comprises:

creating a commissioning digital-double dataset with target data which reproduce characterizing properties of components of the passenger transport system in a target configuration;

creating a finalization digital-double dataset based on the commissioning digital-double dataset by measuring actual data which reproduce characterizing properties of components of the physical passenger transport system in the actual configuration of the passenger transport system immediately after its assembly and installation in a structure, and replacing target data in the commissioning digital-double dataset with corresponding actual data; and creating the UDDD based on the finalization digital-double dataset by updating and matching the finalization digital-double dataset during the operation of the physical passenger transport system, taking into account accelerations and changes in position detected by the detection device.

7. The method of claim 6, wherein the creating the commissioning digital-double dataset further comprises:

creating a digital-double dataset from the component model datasets, based on customer-specific configuration data, and creating production data by modifying the digital-double dataset, based on production-specific data.

8. A device for monitoring a state of a physical passenger transport system, the device comprising:

a UDDD assembled from component model datasets, which reproduces in a machine-processable manner characterizing properties of components of the physical passenger transport system in an actual configuration of the physical passenger transport system after its assembly and installation in a structure; and at least one detection device with a 3-axis sensor element, having an acceleration sensor and a gyroscope, the at least one detection device configured to detect and output as measurement data accelerations and changes in position of a physical escalator step or pallet of a physical conveyor belt of the physical passenger transport system in all three axes along a guide path of the physical passenger transport system during operation;

wherein said measurement data are transmitted to the UDDD and resulting forces, impulses and vibrations, which act on virtual components of a virtual conveyor belt corresponding to physical components of the physical passenger transport system, and on the virtual components which interact with said virtual components, can be determined and evaluated with dynamic simulations based on the UDDD to send a signal to the controller of the physical passenger transports system to lock the conveyor belt upon determining a risk of collision or that at least one of the escalator steps or the pallets of the physical passenger transport system is missing using the dynamic simulations on the UDDD.

9. The device of claim 8, wherein:

the at least one detection device is provided for at least one of the physical escalator steps or pallets of the physical passenger transport system;

each physical escalator step or pallet of the conveyor belt of the physical passenger transport system has an identification, and the at least one detection device further comprises an identification and receiver module for detecting the identifications, wherein the identification and receiver module is arranged in a stationary manner in the physical passenger transport system.

10. The device of claim 8, wherein each of the at least one detection device is provided for each physical escalator step or pallet of the physical passenger transport system.

11. A physical passenger transport system, comprising the device of claim 8.

12. A computer readable medium comprising non-transitory machine-readable program instructions that, when executed on a programmable device, cause the device to execute the method of claim 1.

13. The method of claim 1, further comprising evaluating the forces, impulses and vibration resulting from the measurement data using the dynamic simulations on the UDDD to do at least one of:

determine a time of a potential damage event in which preventive maintenance is conducted prior to a passing of the time of the potential damage event; or derive information about at least one of spare parts or tools that are needed for a repair of the physical passenger transport system.

14. The device of claim 8, wherein said measurement data are transmitted to the UDDD and resulting forces, impulses and vibrations, which act on virtual components of a virtual conveyor belt corresponding to physical components of the physical passenger transport system, and on the virtual components which interact with said virtual components, can be determined and evaluated with dynamic simulations based on the UDDD to:

determine a time of a potential damage event in which preventive maintenance is conducted prior to a passing of the time of the potential damage event; or derive information about at least one of spare parts or tools that are needed for a repair of the physical passenger transport system.

* * * * *